3,183,271
FORMALDEHYDE STABILIZATION

Benjamin D. Halpern, Jenkintown, Pa., and Robert B. Dean, Bainbridge, and Verna B. Gardner, Mount Upton, N.Y., assignors to The Borden Company, New York, N.Y., a corporation of New Jersey
No Drawing. Filed Dec. 1, 1961, Ser. No. 156,519
8 Claims. (Cl. 260—606)

This invention relates to a composition and process for stabilizing solutions of formaldehyde.

The formation and precipitation of solid paraformaldehyde in and from concentrated solutions of formaldehyde in water at moderate temperatures or lower has long been a problem of the formaldehyde industry.

To alleviate the difficulty various expedients have been used or proposed. In wide use is the introduction of 6%–14% of methanol on the weight of the formaldehyde solution, a proportion that involves not only considerable expense but also a foreign material that is either of no value or actually objectionable in certain uses of formaldehyde. The admixture of various material of kind and in amount to give colloidal solutions has also been proposed.

The present invention provides a formaldehyde solution including a surfactant in the proportion of about 0.000001%–0.05% of the solution and, for best results, lower than the critical micellar concentration below which by definition, the agent will exist in the highly dispersed, molecular or non-colloidal condition.

Briefly stated, the invention comprises aqueous formaldehyde solutions containing as the stabilizer polyoxyalkylene derivatives of esters of higher fatty acids and like organic acids. In one embodiment, the invention includes the incorporation of an auxiliary voltalizable stabilizer in amount too small to be effective alone in the liquid phase. Another embodiment includes the introduction of a defoamer to decrease foaming of the solution, which is otherwise increased by the stabilizer, during handling, pumping and shipping. The preferred embodiment comprises admixture of the stabilizer into the formaldehyde when the latter is in monomeric form, and then ageing the compounded solution before subjecting it to cooling to a temperature at which the paraformaldehyde would separate in the absence of the stabilizer.

Using 0.001% of Tween 40 (ethoxylated sorbitan monopalmitate having 20 moles of ethylene oxide introduced per mole of the monopalmitate) on the weight of 37% formaldehyde solution, for example, we have found the solution to remain clear after 57 days' storage on refrigeration to 28°–34° F.

We consider that the stabilizer in this amount below the critical micellar concentration, e.g., below 0.0051 for Tween 40, serves to decelerate or reverse in overall effect the change or changes which, if occurring as usual in the absence of the stabilizer, would cause the formation of paraformaldehyde in amount and condition to precipitate.

The equilibrium involving formaldehyde, water, methylene glycol and paraformaldehyde (dissolved and precipitated) is illustrated, perhaps in oversimplified manner, by the following:

$$n\text{HCHO} + n\text{H}_2\text{O} \rightleftarrows n\text{CH}_2(\text{OH})_2 \rightleftarrows$$

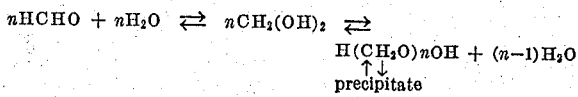

In this reaction, $n$ is the number of moles of formaldehyde represented in the paraformaldehyde.

That the Tween does shift the equilibrium towards the soluble, i.e., the formaldehyde, methylene glycol, or dissolved paraformaldehyde stage, is shown by the fact that the precipitate formed as a cloud in our stabilized solution at very low temperatures redissolves on moderate warming to a temperature at which such dissolving does not occur when the stabilizer has been omitted.

We consider also that the arrangement of the lipophylic and hydrophylic units in our stabilizer, at opposite ends of the molecule, give a "head and tail" effect. We find in fact that the paraformaldehyde which separates as a slime from our stabilized solutions under some conditions has not the firm feel usual for paraformaldehyde but a waxy or soft nature suggesting "tails" of the stabilizer projecting outwardly from the surfaces of the separated particles.

As the stabilizer agent we have found no satisfactory substitute in our small proportion for the water dispersible alkoxylated partial esters. They are nonionic surfactants having the critical balance of lipophilic and hydrophilic and also the "head and tail" orientation of groups of the two types such as represented, for instance, in the alkoxylated partial esters of long chain fatty acids. In general, we use the mono or other water dispersible partial esters of the $C_{12}$–$C_{18}$ monocarboxylic aliphatic acids with water soluble polyhydric alcohols having 2–12 carbon atoms and 2–8 hydroxy groups per molecule as, for instance, glycerine, pentaerithritol, sorbitan, sorbitol, dextrose and sucrose. Examples of the acids represented in the partial esters are lauric, palmitic, oleic and stearic acids and tall oil acids. The partial esters are alkoxylated to the extent of 3–40 and usually 4–20 hydroxyalkyl groups representing alkylene oxide moles per mole of the selected ester.

The auxiliary stabilizer when used is methanol in limited proportion. We attribute its effect to preventing formation of seeding particles of paraformaldehyde in the vapor space above the level of the stabilized liquid formaldehyde solution in partly filled containers.

The formaldehyde in aqueous solution may be of any practical concentration such as 30%–50% at the time of introduction of the alkoxylated surfactant and is free from paraformaldehyde crystals which, if present, would provide seeding for further crystallization. The solution is one that, subsequent to its formation by water absorption of hot monomeric formaldehyde at a temperature above about 250° F. in the gaseous stream from burners in which methanol is oxidized to formaldehyde, has been maintained at a temperature above 70° F. at all times up to and including the introduction of the surfactant. Suitably the solution, after the said introduction, is maintained for a few hours at a temperature of at least 70° F., to permit dispersion of the surfactant to non-micellar condition. The exact temperature which can be withstood before the stabilizer is introduced will depend in part upon the time of standing before the introduction. A few simple trials will show the permissible time for the particular temperature during which the solution can be cooled before the stabilizer is admixed or the permissible temperature for a given time. The ageing, before exposing the product to temperatures at which paraformaldehyde would crystalize, provides time for the stabilizer, now diluted to or below the critical micellar concentration, to dissociate from the colloidal to the monomolecular state.

In order to avoid objectionable foaming, a water dispersible nonionic defoamer is introduced. Examples of such defoamers that we use are polyoxypropylene, of M.W. 1750 combined with 10% of polyoxyethylene on the weight of the total molecule (Pluronics L–61), polyethylene glycol of M.W. about 200 (Carbowax 200), sodium lauryl sulfate (Duponol C), lauryl alcohol, and polyepichlorohydrin (Polyglycol 166–1150).

Proportions of the several additives are tabulated below.

| Component | Percent by Weight of Formaldehyde Solution | |
|---|---|---|
| | Permissible | For Best Results |
| Alkoxylated stabilizer | 0.000001–0.05 | 0.0001–0.001 |
| Volatile supplementary stabilizer | 0–3 | 1–3 |
| Defoamer | Any usual | 0.00001–0.0001 |

The proportions shown in the table are intended especially for 30–37% formaldehyde solutions but are satisfactory for solutions of concentration up to 44% or somewhat higher.

Amounts of the supplementary stabilizer above 1.5% are unnecessary but up to 3% is a satisfactory proportion.

The range of proportions of the alkoxylated stabilizer may be extended somewhat beyond the maximum and minimum amounts tabulated, for stronger or weaker solution of formaldehyde. The use of a proportion above that corresponding after the dilution by mixing, above the critical micellar concentration of the alkoxylated stabilizer, however, causes loss of effectiveness as shown, for instance, by decreased stability of a formaldehyde solution containing 0.1% of the ethoxylated sorbitan monopalmitate (Tween 40) as compared to the stability with 0.001% of the same stabilizer.

As to conditions, the various materials are mixed with conventional techniques and in any order. It is important, however, that the formaldehyde be in aqueous solution and predominantly in monomeric condition as stated above. We find particularly satisfactory results with the alkoxylated stabilizer when it is mixed into the freshly made solution of the hot formaldehyde gas in water at an elevated temperature of the solution such as 100°–220° F. and suitably at about 120°–180° F.

Once the formaldehyde solution has been made and the stabilizer and other additives, if any, are dissolved therein, the solution is ready for storage or shipment but, for best results, is held for at least 4–5 hours at a temperature above 100° F. or 6 hours above 80° F. Longer times of holding are permissible.

The invention will be further illustrated by the following specific examples, proportions in these examples and elsewhere herein being expressed as parts by weight except where specifically stated to the contrary.

Example 1

Tween 40 was mixed into a 37% solution of formaldehyde solution in deionized water, the solution having been prepared by passing hot momomeric formaldehyde containing gas at a temperature above 250° F. from methanol oxidation burners into water in an absorption system and having been maintained above 120° F. at all times subsequent to solution of the formaldehyde. The amount of the Tween was varied, in several preparation, within the range 0.00005%–0.0001% of the weight of the solution. The solutions so compounded were allowed to cool slowly overnight to a final temperature of about 70° F. They were next stored at 52° F. for 74 days and then refrigerated at 28°–34° F. On the last observation, after 57 days at 28°–34° F. samples were still clear.

When comparable tests were made in which portions of the solutions made as described were cooled at once to temperatures at which paraformaldehyde would crystallize in the absence of the surfactant, the said portions were not stabilized and paraformaldehyde crystallized out.

In subsequent examples herein this ageing at or about 70° F. was used for at least 4 hours or at a higher temperature for a shorter time to effect the dispersion of the surfactant.

Example 2

An aqueous formaldehyde solution of 37% concentration of kind used in Example 1 was mixed with 0.0009% of Tween 40 and 0.0001% of Pluronic L-61, the latter as the defoamer. The solution so made does not foam objectionably and is stable at temperatures down to 55° F. for several months.

Example 3

The procedures and compositions of Examples 1 and 2 were used separately and in turn except that there was introduced methanol as volatile, auxiliary stabilizer in the amount of 1.2%–1.5% of the weight of the formaldehyde solution. The methanol decreased the seeding of the solution by paraformaldehyde that, on storage in the absence of methanol, separates in solid form in the vapor space above the liquid solution in partly filled storages and eventually seeds the liquid therebelow.

Example 4

Polyoxyethylene sorbitan monostearate (Tween 60), monolaurate (Tween 20) and monooleate (Tween 80) each having therein 20 hydroxyethyl groups for 1 mole of the monoester were mixed, separately and in turn and each in the two proportions of 0.01% and 0.001%, into 37% formaldehyde solution. The mixtures so made were stored at 52°–60° F. The solutions were stable for 2 weeks or more.

Stability for a week at such temperatures is a significant improvement over unstabilized formaldehyde solution which would precipitate paraformaldehyde within a few hours.

Example 5

Truck shipments of freshly made aqueous solutions of formaldehyde concentration 52% were loaded at 163°–172° F. Into one truck load there was poured 0.0014% of Tween 40 on the weight of the formaldehyde solution and mixed with the solution only by the truck movement. In two others trucks filled comparably and in successive loads there was no addition. When the truck containing the Tween arrived at the destination 13 days later, the percentage of paraformaldehyde crystals in the truck containing the admixed Tween 40 was just under 2% of the net weight of the 77,000 pounds of formaldehyde solution. For the other two trucks of 76,400 and 77,800 lbs. net weight, the paraformaldehyde which had separated after 11 days travel averaged 6.5% of the loads. The improvement is considered very significant in spite of delay in the distribution of the Tween.

Example 6

The procedure and composition of Example 2 are used except that the Pluronic 61 there used is replaced with satisfactory results by an equal weight of any of the other defoamers disclosed herein.

Example 7

The procedure and composition of Example 1 are followed except that the Tween 40 there used is replaced by an equal proportion of any of the other alkoxylated stabilizers disclosed herein used separately and in turn. The solutions so made are satisfactory.

Example 8

Mixed stabilizer consisting of 5 parts of Tween 60 (polyoxyethylene sorbitan monostearate) and 1 part of polyoxyethylene sorbitan trioleate were mixed into 37% solution of formaldehyde in the proportions of 0.01% and 0.001% of the mixed stabilizer, in separate preparations. The resulting stabilizer solutions were clear on the last observation, after 2½ months, except for a thin film on the bottom of the container jars.

It will be understood that it is intended to cover all changes and modifications of the examples of the invention herein chosen for the purpose of illustration which do not constitute departures from the spirit and scope of the invention.

We claim:
1. An aqueous solution stabilized against separation of paraformaldehyde, the solution comprising water, formaldehyde dissolved therein to a concentration of about 30%–50% by weight and an admixed water dispersible nonionic surfactant, the surfactant being the product of alkoxylation of an aliphatic compound with ethylene oxide in the proportion of about 3–40 moles of the oxide to one mole of said aliphatic compound, said aliphatic compound being a partial ester of sorbitol with a $C_{12}$–$C_{18}$ fatty acid, and the proportion of the stabilizer being below the critical micellar concentration and being about 0.000001–0.05 part by weight for 100 parts of said solution.

2. The solution of claim 1, the partial ester being the monoester of sorbitan with a $C_{12}$–$C_{18}$ monocarboxylic aliphatic acid and the alkoxylation thereof being with about 4–20 moles of ethylene oxide to 1 mole of the partial ester.

3. The solution of claim 2, the alkoxylated partial ester being sorbitan monopalmitate alkoxylated with about 20 moles of ethylene oxide for 1 mole of the monopalmitate and the ester being dispersed in non-micellar condition.

4. The solution of claim 1, including methanol as a volatile stabilizer admixed in the proportion of about 1–3 parts by weight for 100 parts of the solution.

5. The solution of claim 1 including a water dispersible nonionic defoamer admixed in the proportion of about 0.00001%–0.0001% on the weight of the formaldehyde solution.

6. The process of making and stabilizing a formaldehyde solution, which comprises dissolving formaldehyde in monomeric form in water in amount to give a concentration of at least 30% of formaldehyde and dispersing therein a nonionic surfactant, the said solution being maintained at a temperature above 100° F. at all times up to and including the dispersion of the surfactant therein, the surfactant being an ethoxylated partial ester of sorbitol with a $C_{12}$–$C_{18}$ monocarboxylic fatty acid, the ethoxylation being with about 3–40 moles of ethylene oxide to 1 mole of the partial ester, and the proportion of said surfactant used being about 0.000001–0.05 part by weight for 100 parts of the said solution.

7. The process of making and stabilizing a formaldehyde solution, which comprises forming a dispersion of a nonionic surfactant in a formaldehyde solution in water of concentration about 30%–50%, the surfactant being a compound alkoxylated with about 3–40 moles of ethylene oxide to 1 mole of the said compound and the said compound being a partial ester of sorbitol with a $C_{12}$–$C_{18}$ monocarboxylic fatty acid, and maintaining the said solution at all times, beginning with the dissolving of the formaldehyde in water and extending up to the dispersion of the stabilizer, at a temperature above 100° F.

8. The process of claim 7 which includes maintaining the resulting dispersion of the surfactant in the formaldehyde solution at a temperature above 70° F. for a period of at least 4 hours after the formation of said dispersion.

References Cited by the Examiner

FOREIGN PATENTS 428,871    5/35    Great Britain.

OTHER REFERENCES

Derwent: Belgian Patents Report, Foreign Patent Journal, vol. 60B, Jan. 15, 1960, p. C18.

Walker: "Formaldehyde," pp. 42–44.

LEON ZITVER, *Primary Examiner.*